US009978550B2

(12) United States Patent
Kamata et al.

(10) Patent No.: US 9,978,550 B2
(45) Date of Patent: May 22, 2018

(54) CURRENT SENSOR AND CONTACTOR APPARATUS

(71) Applicant: KEIHIN CORPORATION, Tokyo (JP)

(72) Inventors: Seiji Kamata, Shioya-gun (JP); Yoichi Kawaguchi, Shioya-gun (JP); Kenichi Takebayashi, Shioya-gun (JP)

(73) Assignee: KEIHIN CORPORATION, Tokyo (JP)

( * ) Notice: Subject to any disclaimer, the term of this patent is extended or adjusted under 35 U.S.C. 154(b) by 851 days.

(21) Appl. No.: 14/200,537

(22) Filed: Mar. 7, 2014

(65) Prior Publication Data

US 2014/0292109 A1 Oct. 2, 2014

(30) Foreign Application Priority Data

Mar. 29, 2013 (JP) ................................ 2013-073233

(51) Int. Cl.
*H02B 1/24* (2006.01)
*H01H 50/02* (2006.01)

(52) U.S. Cl.
CPC .......... *H01H 50/02* (2013.01); *Y10T 307/865* (2015.04)

(58) Field of Classification Search
CPC ............................ H01H 50/02; Y10T 307/865
USPC .......................................................... 307/131
See application file for complete search history.

(56) References Cited

U.S. PATENT DOCUMENTS

| | | | | |
|---|---|---|---|---|
| 7,759,903 B2 * | 7/2010 | Kamata | G01R 31/362 320/132 |
| 2007/0000231 A1 * | 1/2007 | Otsuka | B60H 1/00428 60/203.1 |
| 2009/0295401 A1 * | 12/2009 | Kamata | G01R 31/025 324/509 |
| 2012/0105065 A1 * | 5/2012 | Namou | G01R 31/3275 324/415 |

FOREIGN PATENT DOCUMENTS

| | | |
|---|---|---|
| JP | 2005-153827 A | 6/2005 |
| JP | 2009-289430 A | 12/2009 |

OTHER PUBLICATIONS

Author: Saito Yasushi; Nakamura Takeshi Machine Translated English version of JP 2009-289430, Date of publication: Oct. 12, 2009.*

* cited by examiner

*Primary Examiner* — Richard Tan
(74) *Attorney, Agent, or Firm* — Westerman, Hattori, Daniels & Adrian, LLP

(57) ABSTRACT

A current sensor and contactor apparatus reduces the space required for arranging a current sensor and a contactor. This current sensor and contactor apparatus comprises a current sensor, a contactor and a substrate. The current sensor has a current sensor element, the current sensor detects a current value of power inputted from the outside and outputs a detection signal indicating the current value from the current sensor element. The contactor turns on and off a power line through which the power flows based on a control signal (Continued)

inputted from the outside. On the substrate, the current sensor element of the current sensor is installed and also a plurality of signal lines connecting the current sensor element and the contactor are formed. The current sensor, the contactor and the substrate are integrated.

4 Claims, 3 Drawing Sheets

FIG. 3A LEFT SIDE VIEW
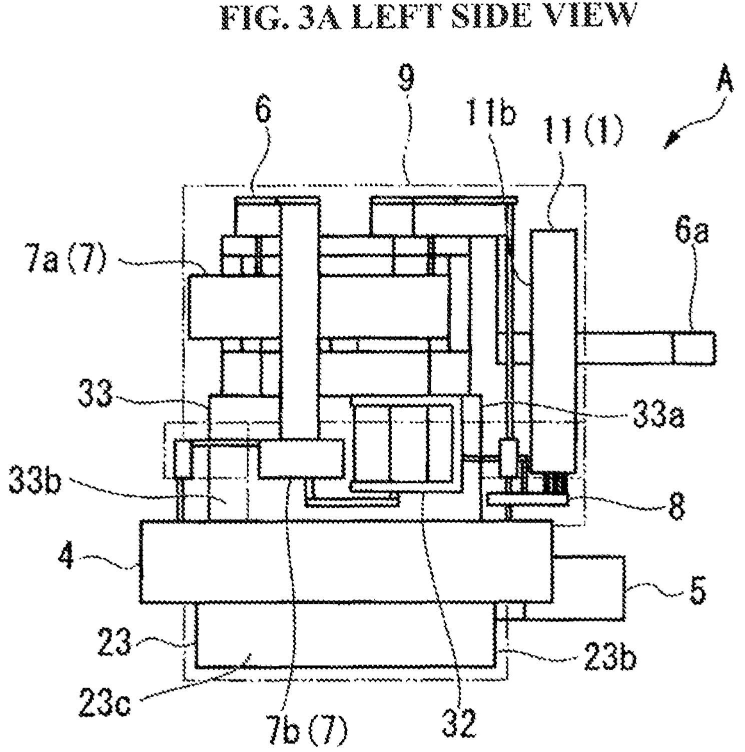
FIG. 3B REAR VIEW
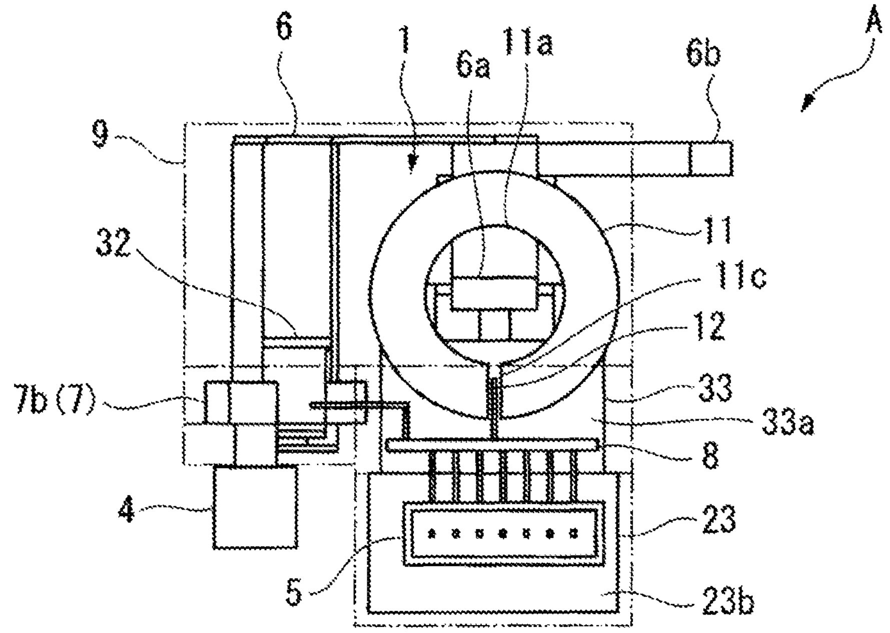

CURRENT SENSOR AND CONTACTOR APPARATUS

CROSS REFERENCES TO RELATED APPLICATIONS

The present application claims priority under 35 U.S.C. § 119 to Japanese Patent Application No. 2013-073233, filed Mar. 29, 2013, entitled "Current Sensor and Contactor Apparatus." The contents of this application are incorporated herein by reference in their entirety.

TECHNICAL FIELD

The present disclosure relates to a current sensor and contactor apparatus.

DESCRIPTION OF THE RELATED ART

In Japanese Patent Application Laid-Open No. 2005-153827, a power storage apparatus used for a vehicle is disclosed, in which a convex portion upstanding from a base surface is formed on a side face on an opposite side adjacent to a battery of a base plate, a battery current sensor, a main contactor of a contactor and a precharge contactor are disposed on a base surface of the side face except for the convex portion, and as opposed to this, a precharge resistor and a DC/DC converter fuse having a height size lower than that of the battery current sensor, the main contactor and the precharge contactor which are mounted on the base surface, are disposed on a top surface of the convex portion.

SUMMARY

However, in the prior art described above, the current sensor and the contactor are individually disposed on the base plate, so there is a problem that a relatively large space is necessary for arranging the current sensor and the contactor.

Therefore, it is preferable to reduce the space required for arranging the current sensor and the contactor.

The first aspect of the present disclosure comprises a current sensor, a contactor and a substrate, wherein the current sensor has a current sensor element, the current sensor detects a current value of power inputted from the outside and outputs a detection signal indicating the current value from the current sensor element, the contactor turns on and off a power line through which the power flows based on a control signal inputted from the outside, and on the substrate, the current sensor element of the current sensor is installed and also a plurality of signal lines connecting the current sensor element and the contactor are formed, and wherein the current sensor, the contactor and the substrate are integrated.

In the second aspect, there are comprised a precharge resistor which is connected in parallel with the contactor, and a precharge contactor which is connected in series with the precharge resistor and is connected in parallel with the contactor so as to turn on and off a power line through which the power flows based on a control signal inputted from the outside, wherein a signal line connected with the precharge contactor is formed on the substrate, and the current sensor, the contactor, the substrate, the precharge resistor and the precharge contactor are integrated.

In the third aspect, the current sensor, the contactor, the substrate and the precharge contactor are packaged by a housing.

In the fourth aspect, the power supplied from an external battery is output to an external inverter.

According to one or more of the above aspects of the present disclosure, it is possible to reduce the space required for arranging the current sensor and the contactor by integrating the current sensor, the contactor and the substrate.

BRIEF DESCRIPTION OF THE DRAWINGS

FIGS. 3A and 3B are a left side view and a rear view, respectively, showing the inside of a current sensor and contactor apparatus A according to one embodiment of the present invention.

DESCRIPTION OF THE EMBODIMENTS

The embodiments of the present invention will be described with reference to the accompanying drawings.

Figure 1:
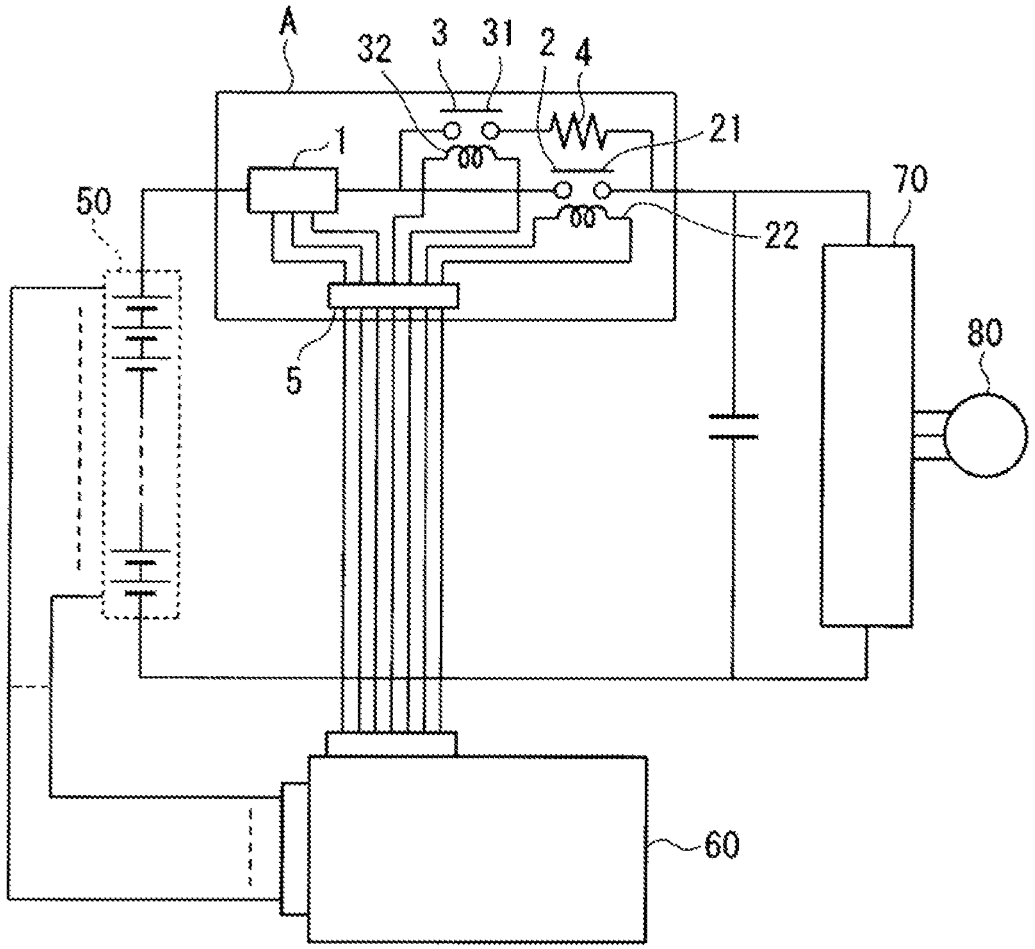
FIG. 1 is a schematic configuration diagram of a voltage detection apparatus A according to one embodiment of the present invention.

As shown in FIG. 1, a current sensor and contactor apparatus A according to the present embodiment is mounted in a moving vehicle such as an electric vehicle (EV) or a hybrid vehicle (HV), together with a battery electronic control unit (ECU) 60, a three-phase inverter 70 and a three-phase motor 80. This current sensor and contactor apparatus A is used for performing detection and control of the current supplied to the three-phase inverter 70 from a battery B.

A battery 50 which includes a plurality of battery cells, is connected to the current sensor and contactor apparatus A, and supplies power to the three-phase inverter 70 via this current sensor and contactor apparatus A.

The battery ECU 60 includes a microcomputer, a voltage detection circuit and the like, wherein the microcomputer includes a central processing unit (CPU), a read only memory (ROM) and a random access memory (RAM), and the voltage detection circuit detects the voltage of each battery cell of the battery 50. In addition, the battery ECU 60 is electrically connected to the battery 50 and the current sensor and contactor apparatus A via a connection line. This battery ECU 60 monitors the voltage states of the respective battery cells constituting the battery 50, and controls the overall operation of the current sensor and contactor apparatus A.

The three-phase motor 80 is, for example, a permanent magnet synchronous motor including a cylindrical rotor and a stator, in which a rotary shaft is inserted in the center of the rotor, and a plurality of permanent magnets arranged in a ring shape with the rotary shaft as the center are housed in the interior thereof. The stator is disposed opposite to the peripheral surface of this rotor, and an armature winding for controlling the rotation of the rotor is housed in the interior of the three-phase motor 80. This three-phase motor 80 causes the rotor to rotate, based on the three-phase drive power (drive power of U, V and W phases) supplied from the three-phase inverter 70.

The three-phase inverter 70 switches the DC power supplied from the battery 50 via the current sensor and contactor apparatus A, based on a pulse width modulation (PWM) signal supplied from a control circuit not shown, thereby generating a three-phase drive power including U phase, V phase and W phase and supplying the generated drive power to the three-phase motor 80.

To generate the drive power of each phase, this three-phase inverter 70 is provided with two switching elements for each phase, that is, includes 6 switching elements in total. The switching element constituting such three-phase inverter 70 is, for example, an insulated gate bipolar transistor (IGBT), a conventional bipolar transistor or a field effect transistor (FET).

On the other hand, as shown in FIG. 1, FIG. 2 and FIGS. 3A, 3B, the current sensor and contactor apparatus A includes a current sensor 1, a main contactor 2, a precharge contactor 3, a precharge resistor 4, a connector 5, a bus bar 6, a supporting member 7, a substrate 8 and a housing 9.

Figure 2:
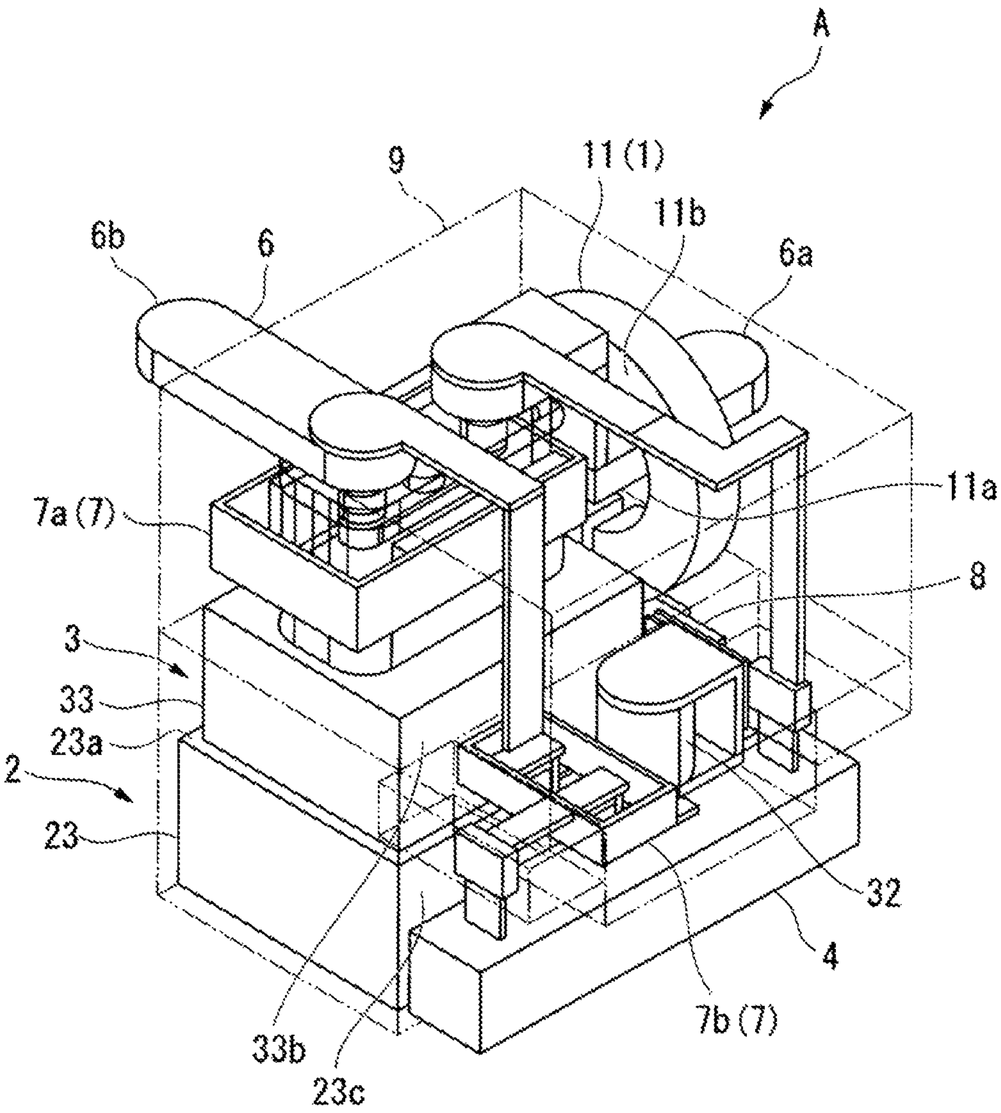
FIG. 2 is a perspective view showing the inside of a current sensor and contactor apparatus A according to one embodiment of the present invention.

As shown in FIG. 2 and FIGS. 3A, 3B, the current sensor 1 includes a current sensor core 11 and a current sensor element 12.

The current sensor core 11 is composed of magnetic materials such as iron, silicon steel, permalloy and ferrite, and takes on a C shape having a predetermined thickness.

In addition, a power input stage 6*a* (on the battery side) of the bus bar 6 is inserted in the central portion of a center hole 11*a* in a C shape of the current sensor core 11, and the current sensor core 11 is supported by a supporting member composed of an insulator not shown, so as to be located in the vicinity of the main contactor 2 and the precharge contactor 3.

In addition, the current sensor core 11 is disposed such that an end face 11*b* on one side is opposite to a housing for precharge contactor housing 33 of the precharge contactor 3 described below which is disposed on the main contactor 2, and a gap 11*c* formed between the tip ends of a C shape opposite to each other is opposite to the surface of the substrate 8. The magnetic flux generated by a current flowing through the bus bar 6 is converged in the above-mentioned gap 11*c*.

The current sensor element 12 is, for example, a Hall integrated circuit having three terminals (an input terminal, a ground terminal and an output terminal). This current sensor element 12 is installed in an upright posture on the substrate 8 arranged in the vicinity of the main contactor 2 and the precharge contactor 3. In addition, in the current sensor element 12, a Hall element as a component of the Hall integrated circuit is inserted into the gap 11*c* of the current sensor core 11. The current sensor element 12 detects the intensity of the magnetic flux converged in the gap 11*c* of the current sensor core 11, and outputs a detection signal indicating the intensity of the magnetic flux to the battery ECU 60 via the connector 5 and a signal line formed on the substrate 8.

The main contactor 2 controls the power supplied to the three-phase inverter 70 from the battery 50, and is an electromagnetic switch including a mechanical contact 21 and a drive coil 22 for turning on/off the mechanical contact 21. This main contactor 2 connects one end of the above-mentioned mechanical contact 21 to the positive pole of the battery 50 via the bus bar 6, and connects the other end of the above-mentioned mechanical contact 21 to the three-phase inverter 70 via the bus bar 6.

In addition, the two ends of the drive coil 22 of the main contactor 2 are connected to the battery ECU 60 via the connector 5 and the signal line formed on the substrate 8. That is, the main contactor 2 turns on/off the mechanical contact 21 by using a magnetic force generated in the drive coil 22 based on a drive signal (control signal) inputted from the battery ECU 60, and controls the power supplied to the three-phase inverter 70 from the battery 50.

In addition, as shown in FIG. 2 and FIGS. 3A, 3B, the main contactor 2 includes a housing for main contactor 23, wherein the housing has a box shape which houses the mechanical contact 21 and the drive coil 22 described above. This housing for main contactor 23 is composed of an insulator such as resin. In addition, the precharge contactor 3 is disposed on a top surface 23*a* of the housing for main contactor 23. Such the housing for main contactor 23 is disposed such that a rear face 23*b* is adjacent to the connector 5, and a left side face 23*c* is opposite to the precharge resistor 4.

The precharge contactor 3 is used for limiting the current flowing through the main contactor 2 to protect the main contactor 2. Similar to the main contactor 2, the precharge contactor 3 is also an electromagnetic switch including a mechanical contact 31 and a drive coil 32 which turns on/off the mechanical contact 31.

One end of the above-mentioned mechanical contact 31 of this precharge contactor 3 is connected to the positive pole of the battery 50 via the bus bar 6, and the other end of the above-mentioned mechanical contact 31 is connected to the resistor 4 via the bus bar 6. That is, the precharge contactor 3 is connected in parallel with the main contactor 2 while being connected in series with the precharge resistor 4.

In addition, the two ends of the drive coil 32 of the precharge contactor 3 are connected to the battery ECU 60 via the connector 5 and the signal line formed on the substrate 8. That is, the precharge contactor 3 turns on/off the mechanical contact 31 by using a magnetic force generated in the drive coil 32 based on a drive signal (control signal) inputted from the battery ECU 60, and controls the current flowing through the main contactor 2.

In addition, as shown in FIG. 2 and FIGS. 3A, 3B, the precharge contactor 3 includes a housing for precharge contactor 33, wherein the housing has a box shape which houses the above-mentioned mechanical contact 31. This housing for precharge contactor 33 is composed of an insulator such as resin. In addition, the housing for precharge contactor 33 is disposed on the top surface 23*a* of the housing for main contactor 23. In addition, the housing for precharge contactor 33 is disposed such that a rear face 33*a* is opposite to the end face 11*b* on one side of the current sensor core 11 and the substrate 8, and a left side face 33*b* is opposite to the drive coil 32. In addition, the above-mentioned drive coil 32 is disposed so as to be exposed above the precharge resistor 4.

The precharge resistor 4 is, for example, a cement resistor. One end of the precharge resistor 4 is connected to the other end of the mechanical contact 31 of the precharge contactor 3, and the other end of the precharge resistor 4 is connected to the three-phase inverter 70. That is, the precharge resistor 4 is connected in parallel with the main contactor 2.

In addition, the precharge resistor 4 is in a state of being suspended by the bus bar 6, and is disposed so as to be opposite to the left side face 23*c* of the housing for main contactor 23. After the precharge contactor 3 changes into the closed state, such the precharge resistor 4 is supplied with power by the battery 50, and converts the power into thermal energy, that is, generates heat.

The connector 5 is an interface which connects a signal line and the battery ECU 60, wherein the signal line is formed on the substrate 8 which connects the current sensor 1, the main contactor 2 and the precharge contactor 3. This connector 5 is supported by a supporting member not shown, and is disposed so as to be adjacent to the rear face 23*b* of the housing for main contactor 23, below the substrate 8.

The bus bar 6 is a power line which is formed by combining elongated plate-like components composed of a conductor such as copper. The power input terminal 6*a* of this bus bar 6 is connected to the battery 50, and a power output terminal 6*b* is connected to the three-phase inverter 70. In addition, the bus bar 6 is electrically connected via the main contactor 2, the precharge contactor 3 and the precharge resistor 4. Such a bus bar 6 is supported by the supporting member 7 (supporting members 7*a* and 7*b*) composed of an insulator.

The supporting member 7 includes the supporting member 7*a* which is disposed above the housing for precharge contactor 33, and the supporting member 7*b* which is disposed so as to be opposite to the left side face 33*b* of the housing for precharge contactor 33. This supporting member 7*a* and supporting member 7*b* are composed of an insulator such as resin, and support the bus bar 6.

The substrate 8 is a rectangular substrate, which adopts an insulator such as glass fiber reinforced epoxy resin as the base material, and on the surface of which a plurality of signal lines are formed. The signal lines of the substrate 8 are connected to the current sensor element 12 of the current sensor 1, the drive coil 22 of the main contactor 2 and the drive coil 32 of the precharge contactor 3. This substrate 8 is disposed so as to be opposite to the rear face 33*a* of the housing for precharge contactor 33, so as to avoid thermal effects of the main contactor 2 and the precharge contactor 3.

The housing 9 is composed of an insulator such as resin, and is used for accommodating the current sensor 1, the main contactor 2, the precharge contactor 3, the connector 5, the bus bar 6, the supporting member 7 and the substrate 8. That is, the housing 9 accommodates the components other than the precharge resistor 4. This is to cause the heat generated in the precharge resistor 4 to diffuse to the outside. Such the housing protects the current sensor 1, the main contactor 2, the precharge contactor 3, the connector 5, the bus bar 6, the supporting member 7 and the substrate 8 described above from physical impact or the like applied externally.

According to the present embodiment, the current sensor 1, the main contactor 2, the precharge contactor 3 and the precharge resistor 4 are integrated. As a result, the space required for arranging the current sensor 1, the main contactor 2, the precharge contactor 3 and the precharge resistor 4 is reduced. In addition, by integrating the current sensor 1, the main contactor 2, the precharge contactor 3 and the precharge resistor 4 as described above, it is possible to install these components simultaneously, and save the amount of labor for installation operation.

The embodiments of the present invention have been described above. However, the present invention is not limited to the above embodiments. For example, the following modifications may also be considered.

(1) Although in the above embodiments, the precharge contactor 3 and the precharge resistor 4 are provided, the present invention is not limited thereto. As for the precharge contactor 3 and the precharge resistor 4, they may also not be provided if the functions thereof are not required. In addition, the numbers of the main contactors 2, the precharge contactors 3 and the precharge resistors 4 may be one, and may also be plural.

(2) In the above embodiments, the power supplied from the battery 50 is output to the three-phase inverter 70, that is, the apparatus is provided between the battery 50 and the three-phase inverter 70. However, the apparatus may also be provided in other positions instead of between the battery 50 and the three-phase inverter 70. The present invention is not limited to the embodiments described above, and various design alterations can be implemented within the scope not departing from the spirit thereof.

We claim:

1. A current sensor and contactor apparatus comprising:

a current sensor;

a contactor; and a substrate, wherein the current sensor has a current sensor element, the current sensor detects a current value of power inputted from an outside and outputs a detection signal indicating the current value from the current sensor element, the contactor turns on and off a power line through which the power flows based on a control signal inputted from the outside, and on the substrate, the current sensor element of the current sensor is installed and also a plurality of signal lines are formed, the plurality of signal lines including a first signal line connected to the current sensor element and a second signal line connected to the contactor, wherein the current sensor, the contactor and the substrate are integrated, wherein the current sensor and contactor apparatus further comprises:

a precharge resistor which is connected in parallel with the contactor, a precharge contactor which is connected in series with the precharge resistor and is connected in parallel with the contactor so as to turn on and off a power line through which the power flows based on the control signal inputted from the outside, and a first housing containing the contactor and a second housing containing the precharge contactor, wherein a signal line connected with the precharge contactor is formed on the substrate, and the current sensor, the contactor, the substrate, the precharge resistor and the precharge contactor are integrated, wherein the current sensor, the contactor, the substrate and the precharge contactor are packaged by a housing, and wherein the precharge resistor is disposed outside the housing.

2. The current sensor and contactor apparatus according to claim 1, wherein the power supplied from an external battery is output to an external inverter.

3. The current sensor and contactor apparatus according to claim 1, wherein the current sensor, the contactor, the substrate and the precharge contactor are integrated in a single housing.

4. The current sensor and contactor apparatus according to claim 1, wherein the second housing is disposed right above the first housing.

* * * * *